United States Patent
Park

(10) Patent No.: US 9,713,402 B2
(45) Date of Patent: Jul. 25, 2017

(54) CONTAINER LID FOR VACUUM SEALING HAVING LOCKING PARTS AND VACUUM-SEALED CONTAINER EMPLOYING SAME

(71) Applicant: BORU INTERNATIONAL CO., LTD., Gyeonggi-do (KR)

(72) Inventor: Sou Kyu Park, Yongin-si (KR)

(73) Assignee: BORU INTERNATIONAL CO., LTD., Gyeonggi-Do (KR)

( * ) Notice: Subject to any disclaimer, the term of this patent is extended or adjusted under 35 U.S.C. 154(b) by 40 days.

(21) Appl. No.: 14/769,462

(22) PCT Filed: Feb. 19, 2014

(86) PCT No.: PCT/KR2014/001330
§ 371 (c)(1),
(2) Date: Aug. 21, 2015

(87) PCT Pub. No.: WO2014/129790
PCT Pub. Date: Aug. 28, 2014

(65) Prior Publication Data
US 2016/0000271 A1    Jan. 7, 2016

(30) Foreign Application Priority Data

Feb. 22, 2013 (KR) .................. 10-2013-0019276

(51) Int. Cl.
*B65D 51/16* (2006.01)
*A47J 47/10* (2006.01)
(Continued)

(52) U.S. Cl.
CPC .............. *A47J 47/10* (2013.01); *B65D 43/06* (2013.01); *B65D 45/18* (2013.01); *B65D 45/20* (2013.01);
(Continued)

(58) Field of Classification Search
CPC .... B65D 81/2015; B65D 45/18; B65D 45/20; B65D 81/2038; B65D 51/1644
(Continued)

(56) References Cited

U.S. PATENT DOCUMENTS 6,035,769 A * 3/2000 Nomura ................ A47J 36/027
                                                  219/730
7,048,136 B2 * 5/2006 Havens .............. B65D 51/1644
                                                  206/524.8
(Continued)

FOREIGN PATENT DOCUMENTS

EP          2177457      *  4/2010
EP          2177457 A1     4/2010
(Continued)

OTHER PUBLICATIONS

International Search Report issued in corresponding application No. PCT/KR2014/001330 on Jun. 23, 2014.

*Primary Examiner* — Fenn Mathew
*Assistant Examiner* — Don M Anderson
(74) *Attorney, Agent, or Firm* — Roberts Mlotkowski Safran Cole & Calderon P.C.

(57) ABSTRACT

Disclosed is a container lid for vacuum sealing which generates negative pressure in the internal space of a container, which is provided by covering the open upper part of a container main body, and seals same. An annular packing is mounted so as to go around the inner surface of a lid main body, and a check valve is mounted in the inner part of the outer surface of the lid main body. The check valve generates negative pressure in the internal space of the container by allowing air inside the container to flow to the outside but preventing outside air from flowing into the container when a pressure difference occurs between the inside and outside of the container. A plurality of self catching protrusions are provided respectively at a plurality of points on the edges of (Continued)

the lid main body, and a plurality of locking members are mounted respectively and pivotably in sections adjacent to the plurality of self catching protrusions. Each locking member comprises: self-locking protrusions which are press-fitted and coupled to the self catching protrusions in a closed state so that the locking members are not released; and main body-locking protrusions which prevent the container lid from being taken off from the container main body by being caught by the circumference of the opening part of the container main body or a main body catching protrusion, even if the container lid rises due to the expansion of the packing as a result of a decrease in the negative pressure generated inside the container.

21 Claims, 12 Drawing Sheets

(51) Int. Cl.
*B65D 81/20* (2006.01)
*B65D 45/20* (2006.01)
*B65D 43/06* (2006.01)
*B65D 45/18* (2006.01)
*B65D 43/02* (2006.01)

(52) U.S. Cl.
CPC ..... *B65D 51/1644* (2013.01); *B65D 81/2015* (2013.01); *B65D 81/2038* (2013.01); *B65D 43/02* (2013.01); *B65D 2543/00101* (2013.01); *B65D 2543/00203* (2013.01); *B65D 2543/00564* (2013.01)

(58) Field of Classification Search
USPC .................. 220/231, 784, 788; 206/372, 373
See application file for complete search history.

(56) References Cited

U.S. PATENT DOCUMENTS

| | | | |
|---|---|---|---|
| 2003/0038131 A1* | 2/2003 | Nomura | A47J 36/027 219/735 |
| 2007/0095849 A1 | 5/2007 | Kim | |
| 2007/0265587 A1* | 11/2007 | Chen | B65D 81/2038 604/319 |
| 2012/0267369 A1 | 10/2012 | Duvigneau | |

FOREIGN PATENT DOCUMENTS

| | | |
|---|---|---|
| KR | 10-0780813 B1 | 11/2007 |
| KR | 10-2009-0034673 A | 4/2009 |
| KR | 101215439 B1 | 12/2012 |

* cited by examiner

When container lid is simply on container main body

When force is applied vertically on container lid

When high negative pressure is formed in container using vacuum pump

When negative pressure is weakened in container (a)

(b)

A cross-sectional view of along line A-A'

(a)

(b)

(a)

(b)

CONTAINER LID FOR VACUUM SEALING HAVING LOCKING PARTS AND VACUUM-SEALED CONTAINER EMPLOYING SAME

FIELD OF TECHNOLOGY

The invention relates to a container lid for vacuum sealing maintaining negative pressure in an internal space of the container and a vacuum-sealed container employing the same, more specifically to a container lid for vacuum sealing, in which additional locking portion in the container lid besides a suction locking of the container lid with respect to the container main body by negative pressure generated in the internal space of the container is provided so that even when the negative pressure is weakened the container lid is prevented from being released from the container main body, and a vacuum-sealed container employing the same.

BACKGROUND OF TECHNOLOGY

Foods are changed slowly by various kinds of fungi existing in air. In order to slow down the speed of change of foods, besides a method using refrigerator, a vacuum-storing method has been used, in which air in the container is removed, making the pressure lower inside than outside. Prior arts about vacuumed container used in the vacuum-storing method include Korean Application Publications 10-2008-0014536 (Title: Multi-purpose Vacuum Container Lid) and 10-2010-0078576 (Title: Vacuum Container Lid and Check Valve and Packing for the Same).

According to vacuumed containers disclosed by the two prior arts, air in the internal space of the container escapes outwards through a check valve provided in a container lid by pressure (external force) applied when disposing a packing at the opening part of the container and covering with the container lid, and if the external force is removed in such a state, the volume of the internal space of the container gets larger due to the packing's elasticity, but since the check valve shuts down external air entering into the inside of the container, a vacuum mood of lower than the atmosphere is made in the internal space of the container. According to such a vacuum-making structure, the pressure difference between the inside and outside of the container maintains the container lid stuck to the opening part of the container main body. Since the pressure difference is large, it is very hard for a person to detach the container lid from the container main body forcefully unless the check valve is opened forcefully. Since the locking function of the container lid is obtained using such pressure difference between the inside and outside of the container, and in order to avoid a structural complexity, any separate locking means was not provided.

However, it was found through actual usage that the following improvements are needed for the locking function using the pressure difference between the inside and outside of the container. Even though packing or check valve is made with silicon or rubber with excellent sealing function, since they cannot provide a perfect sealing, as time goes on, the pressure difference between the inside and outside of the container gets smaller and smaller, and the locking force of the container lid with respect to the container main body is weakened accordingly, so that sometimes it falls in a state, in which when pull up the container lid it get detached easily from the container main body. If the container is used constantly without washing completely, small debris (food scraps, etc.) may be stuck between the packing or check valve and a surface of the container, and then sealing can be damaged due to such a portion with debris. In such a case, weakening of pressure difference may speed up. In cases, the user tampers the check valve and external air may be introduced into the container, resulting in a similar situation. In such a state, if the user thinks that the container lid is attached strongly to the container main body and takes it out of the refrigerator, for example, by holding the container lid only, the container lid can be detached from the container main body by giving in to the weight of the container main body and contents in it. In such a case, the container main body can be toppled right away, or falls down after being lifted for a short while, pouring out the contents undesirably. If, when carrying food in the container for a picnic, the locking of container lid is weakened due to the above weakening of pressure difference, liquid contents may ooze out of the container when there is shaking or tilting.

On the other hand, there are various kinds of containers for food such as bowl-type or plate-type. Also, the shapes of container are diverse. In a case of bowl-type container, there is a shape, in which a side wall of the container is perpendicular to a bottom floor or more and more inclined outwards as approaching an opening part. In a case of plate-type container, the edge of opening part is nearly horizontal. Almost all the cases, such conventional containers do not have any structure having separate locking protrusions for engaging with a vacuum-sealed container lid. It is necessary to improve lids of such vacuum-sealed containers so as to engage stably with such vacuum-sealed containers without separate locking protrusions, preventing the contents from spilling.

DETAILED DESCRIPTION OF INVENTION

Problems to Solve

An object of the invention is to solve the above problems and provide a container lid for vacuum sealing and vacuum-sealed container employing same, in which the container lid suction-locks to a container main body by negative pressure formed in an internal space of container and at the same time even if the negative pressure is weakened the locking state of the container lid with the container main body can be maintained through a separated self-locking means, so as to prevent the container from being spilled when lifting up by holding the container lid or the contents in the container from spilling.

Also, other object of the invention is to provide a container lid for vacuum sealing having self-locking means and vacuum-sealed container employing same, which can be applied flexibly to various conventional container main bodies without separate locking protrusions for engaging container lid.

Technological Solutions to Problems

According to an embodiment of the invention for solving the above problems, a container lid for vacuum sealing is provided, which maintains negative pressure in an internal space provided by covering an open upper part of container main body and seals. The container lid comprises: a packing-installing groove provided so as to go around an internal surface of a lid main body for covering an open upper part of the container main body; a closed-loop shape packing installed in the packing-installing groove and sealing contacting surface by press-fitting between an opening part of the container main body and the packing-installing groove; a check valve installing part provided on an external surface of the lid main body and in the packing-installing groove; a check valve installed in the check valve installing part and configured for generating negative pressure in the internal space of the container by allowing air inside the container to flow to the outside but preventing outside air from flowing into the container when a pressure difference occurs between the inside and outside of the container in a state that the container lid covers and seals an open upper part of the container main body; a plurality of self catching protrusions provided at two or more portions of an edge of the container lid; and a plurality of locking members, each of which being installed rotatably in portions of the edge of the lid main body neighboring the plurality of the self catching protrusions. Each of the plurality of locking members comprises a main body locking protrusions preventing the container lid from being detached from the container main body by latching to an edge of the container main body when the negative pressure in the internal space of the container is weakened in a closed state, and a self-locking protrusion preventing the locking member from opening by being press-fitted and engaging the self catching protrusion in the above closed state.

Preferably, the container lid is configured, while a pressure difference between the internal space of the container and an outside of the container in maintained, for pressing down on the packing with a force corresponding to the pressure difference and being press-fitted to the open top part of the container main body.

The lid main body is provided with the packing-installing groove and the check valve installing part respectively in an edge circumference of an inner surface and in a edge circumference of an outer surface, and comprises an opening cover portion covering an open upper part of the container main body, a locking-member installing portion bent at an edge of the opening cover portion, extending downwards, enclosing an outer side surface of the opening part portion of the container main body, and enabling to install the plurality of locking-members at least at two locations, and a side surface enclosing portion provided with the self catching protrusions.

According to an embodiment, the locking-member installing portion comprises a locking-member installing groove provided in a form in which a section corresponding to a length of the locking member is cut out from the side surface enclosing portion and a pair of rotational axle supporting protrusions protruding in a circumferential direction from two facing side surfaces of the locking-member installing groove facing each other. The locking member comprises a rotational axle supported rotatably by a pair of protrusion-inserting groove provided at both ends inserted respectively by the pair of rotational axle supporting members, and a locking wing that is bent at the rotational axle, extending side by side with the side surface enclosing portion, and formed with the self-locking protrusions and the main body locking protrusions inside. In such a case, preferably the locking-member installing portion further comprises a pair of locking-member supporting portions provided on both side surfaces facing each other in a circumferential direction with respect to the locking-member installing groove in thick and strengthened forms so as to withstand force applied to the locking member. Preferably, the pair of the rotational axle supporting protrusions are provided on two facing inner surfaces of the pair of the locking-member supporting portions. Preferably, the self catching protrusions are provided respectively at lower ends of the pair of locking-member supporting portions.

According to another embodiment, the locking-member installing portion comprises a locking-member supporting portion extending by a specific length side by side with the side surface enclosing portion from an edge of the opening part covering portion in a partial section of a section of the side surface enclosing portion corresponding to a length of the locking member, a pair of locking-member installing grooves provided in forms of cutting out a remaining sections on both sides of the locking-member supporting portion, and a pair of rotational axle supporting protrusions protruding in opposite circumferential directions from two opposing side surfaces in circumferential direction of the locking-member supporting portion. The locking member comprises a pair of rotational axle aligned with an interval corresponding to a distance of the partial middle section, received in the pair of locking-member installing grooves respectively, inserted to the pair of rotational axle supporting protrusions on facing surfaces, and enabling the locking member to rotate, and a locking wing bent at the pair of the rotational axles, extending side by side with the side surface enclosing portion, having a portion corresponding to the locking-member supporting portion bored but an entirety being of one body, and having the self-locking protrusions and the main body locking protrusions formed on an inner surface. In such a case, the self catching protrusions are provided at least one of lower ends of both farthest side surfaces of the locking-member installing grooves or lower ends of the locking-member supporting portion.

In the container lid for vacuum sealing, preferably the locking member further comprises a handle provided by protruding horizontally on an external surface so as to pull up the container lid by hooking a finger.

As for the press-sealing of the container lid with respect to the container main body, if a high pressure is formed in an internal space of the container by lowering the container lid with an external force and press-fitting on the opening part portion of the container main body, the check valve provides an air venting path so as to allow air in the internal space of the container escape to outside of the container, and if the external force is removed, the packing expands with its own elasticity pushing up the container lid and forming negative pressure in the internal space of the container, and the check valve is sucked on a surface of the check valve installing portion closing the air venting path so as to maintain the negative pressure in the internal space of the container, and at the same time the container lid presses down on the packing due to the pressure difference between the internal space and outer space of the container, so as to be suction-engaged strongly to the opening part portion of the container main body.

In the container lid for vacuum sealing, in a state of sealing an empty space formed by enclosing the check valve and the check valve installing portion and covering, if a pressure in the empty space is lowered below a pressure of the internal space of the container by pumping with a vacuum pump, it is configured that the check valve provides an air venting path due to weakening of press-fitting force with a surface of the check valve installing portion and air in the internal space of the container escapes into the empty space through the air venting path and is vented out to the outside of the container through the vacuum pump, so as to form larger negative pressure in the internal space of the container.

If a main body catching protrusion is provided near to an external surface opening part of the container main body, while negative pressure is formed in the internal space of the container, the main body locking protrusions are away from a bottom surface of the main body catching protrusions not caught by the main body catching protrusions, but as the negative pressure in the internal space of the container is reduced, the packing expands and push up the container lid so as to make the main body locking protrusions caught by the main body catching protrusions, so that even though the negative pressure in the internal space of the container is relieved, preferably, the container lid is configured of not being disengaged from the container main body.

When the container main body is of a type of a dish having an edge of the opening part that is a horizontal or tilted surface extending sideways, preferably, the main body locking protrusions are disposed away from a bottom surface of an edge of the opening part and not caught while the negative pressure is formed in the internal space of the container, but as the negative pressure formed in the internal space of the container gets decreasing, the packing expands and pushes the container lid upwards so that the main body locking protrusions are caught at the edge of the opening part, such that even though the negative pressure in the internal space of the container is relieved the container lid is not disengaged from the container main body.

When the container main body is of a type of a bowl having a side wall and a top opening part that is a tilted surface extending upwards, preferably, the main body locking protrusions are disposed away from a bottom surface of an outer surface of the opening part and not caught while the negative pressure is formed in the internal space of the container, but as the negative pressure formed in the internal space of the container gets decreasing, the packing expands and pushes the container lid upwards so that the main body locking protrusions are caught at the outer surface of the opening part, such that even though the negative pressure in the internal space of the container is relieved the container lid is not disengaged from the container main body.

The check valve comprises a valve body portion having an outer surface resembling a caldron lid and an inner surface having a suction-sealing portion including a concave portion disposed in a center and having a specific area and a tilting surface bending from an edge of the concave portion and extending obliquely downwards, a vacuum-indicating portion formed convexly upwards in a form of thin film on a partial region of the concave portion, a protruding bump protruding upwards on an outer surface of the valve body portion, and a fixing portion extending downwards in a center of the internal space of the concave portion and having a latching bump formed in a middle, and the entire container lid is formed monolithically using silicon or rubber. The vacuum-indicating portion collapses downwards convexly while the negative pressure is formed in the internal space of the container. The valve body portion gets decreasing thickness as going in a radial direction from the center of the concave portion and the suction-sealing portion comprises closed-loop shape edge protrusions that compensates thickness and increases suction-sealing force as going around an edge of outer surface. The check valve-installing portion has a form of concave groove for installing the check valve, and a valve-engaging hole to which the fixing portion is pressed in and fixed, an air-circulating path having a shape of annular groove enclosing the valve-engaging hole, and an air-venting hole bored from inside of the air-circulating path to the internal space of the container are provided in a bottom of groove of the check valve-installing portion. And, when there is negative pressure in the internal space of the container, the concave portion of the check valve covers top of the air-circulating path and its inner region while staying away therefrom, and the suction-sealing portion is sucked and attached to a floor surface of the check valve-installing portion outside the air-circulating path, sealing the attaching surface.

On the other hand, according to another embodiment, a vacuum sealing container comprises: a container main body having an open upper part, providing a receiving space inside, and provided with a main body catching protrusion on an outer surface besides an opening part; and a container lid for forming negative pressure in an internal space provided by covering the open upper part of the container main body for sealing. In the vacuum sealing container, the container lid comprises: a packing-installing groove provided so as to go around an internal surface of a lid main body for covering an open upper part of the container main body; closed-loop shape packing installed in the packing-installing groove and sealing contacting surface by press-fitting between an opening part of the container main body and the packing-installing groove; a check valve installing part provided on an external surface of the lid main body and in the packing-installing groove; a check valve installed in the check valve installing part and configured for generating negative pressure in the internal space of the container by allowing air inside the container to flow to the outside but preventing outside air from flowing into the container when a pressure difference occurs between the inside and outside of the container in a state that the container lid covers and seals an open upper part of the container main body; a plurality of self catching protrusions provided at two or more portions of an edge of the container lid; and a plurality of locking members, each of which being installed rotatably in portions of the edge of the lid main body neighboring the plurality of the self catching protrusions. Each of the plurality of locking members comprises a main body locking protrusions preventing the container lid from being detached from the container main body by the packing's expanding and pushing the container lid upwards and latching to the main body catching protrusions as the negative pressure in the internal space of the container is weakened in a closed state, and a self-locking protrusion preventing the locking member from opening by being press-fitted and engaging the self catching protrusion in the above closed state.

Effects of Invention

In a container lid according to the invention, even though negative pressure formed in the internal space of container decreases and the engaging force between the container main body and the container lid is weakened, a separate locking means provided in the container lid can maintain the container lid in the engaging state to the container main body. Therefore, irrespective of decrease of negative pressure formed in the internal space of container, the container lid only can be grabbed and lifted up without spilling the contents or tilted without leaking of the contents, because the container lid can maintains the engaging state with the container main body all the time.

Since the locking means provided in the container lid of the invention has a self catching structure and a catching structure with respect to the container main body doubly, irrespective of catching with the container main body, the locking means does not dangle, the closing state can be maintained all the time, which is convenient.

Also, the container lid of the invention can be applied not only to a container main body made specially, but also to regular containers. The catching structure with respect to the container main body can be applied without a structural change (such as providing a separate catching protrusion), flexibly to various sizes of container main bodies.

BRIEF DESCRIPTION OF DRAWINGS

FIG. 9 is a perspective view of a locking member, and FIGS. 10 and 11 a plan view and a side view of container lid, in which a locking member is installed in the container lid main body and the container lid is closed;

BEST MODE OF EMBODIMENTS OF INVENTION

Figure 1:
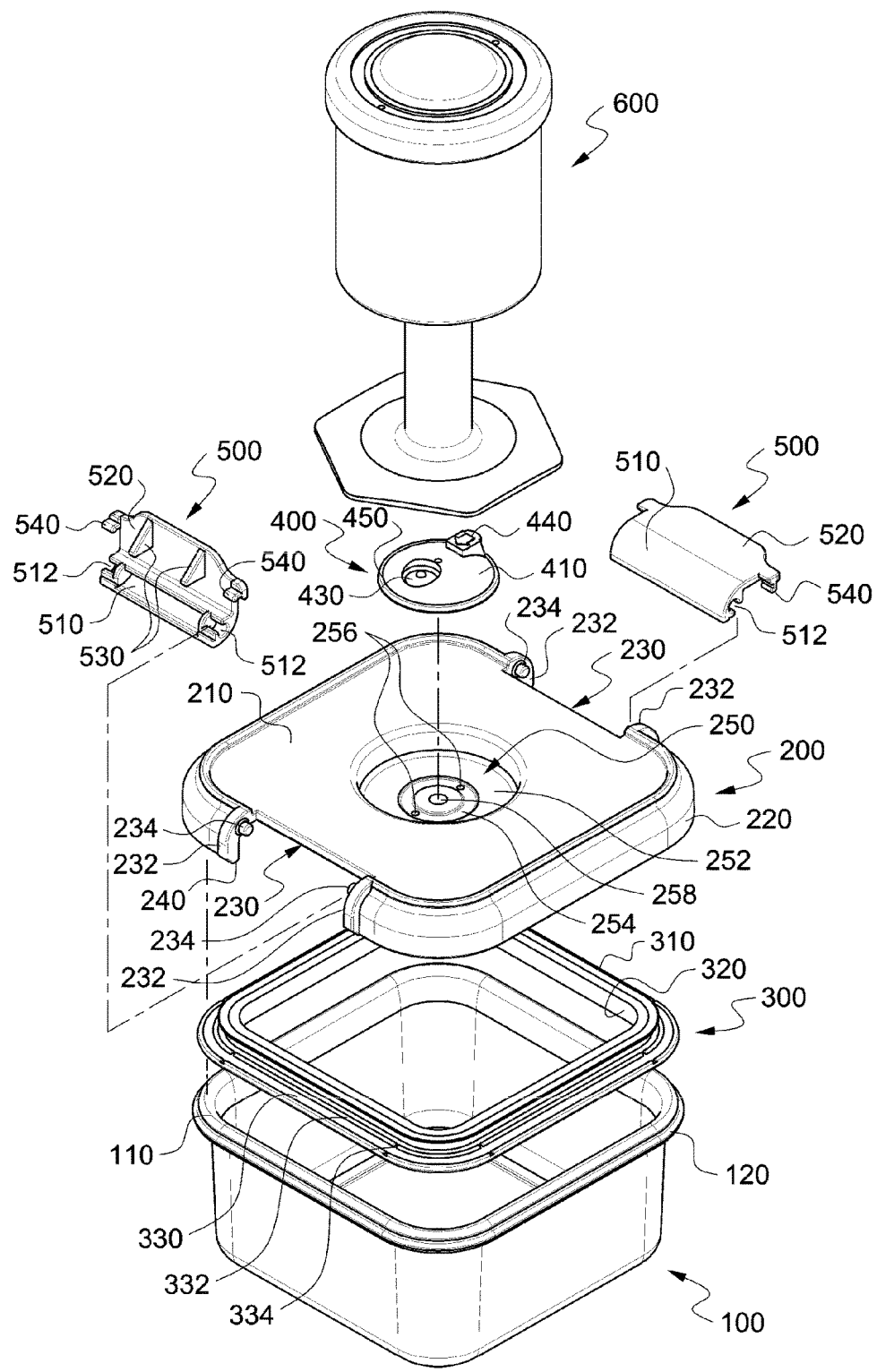
FIGS. 1 to 3 are exploded perspective views of a container lid and a container main body according to a first embodiment of the invention, FIG. 1 being a state viewed in a lower diagonal direction, FIG. 2 in an upper diagonal direction, and FIG. 3 in a side direction.
Figure 2:
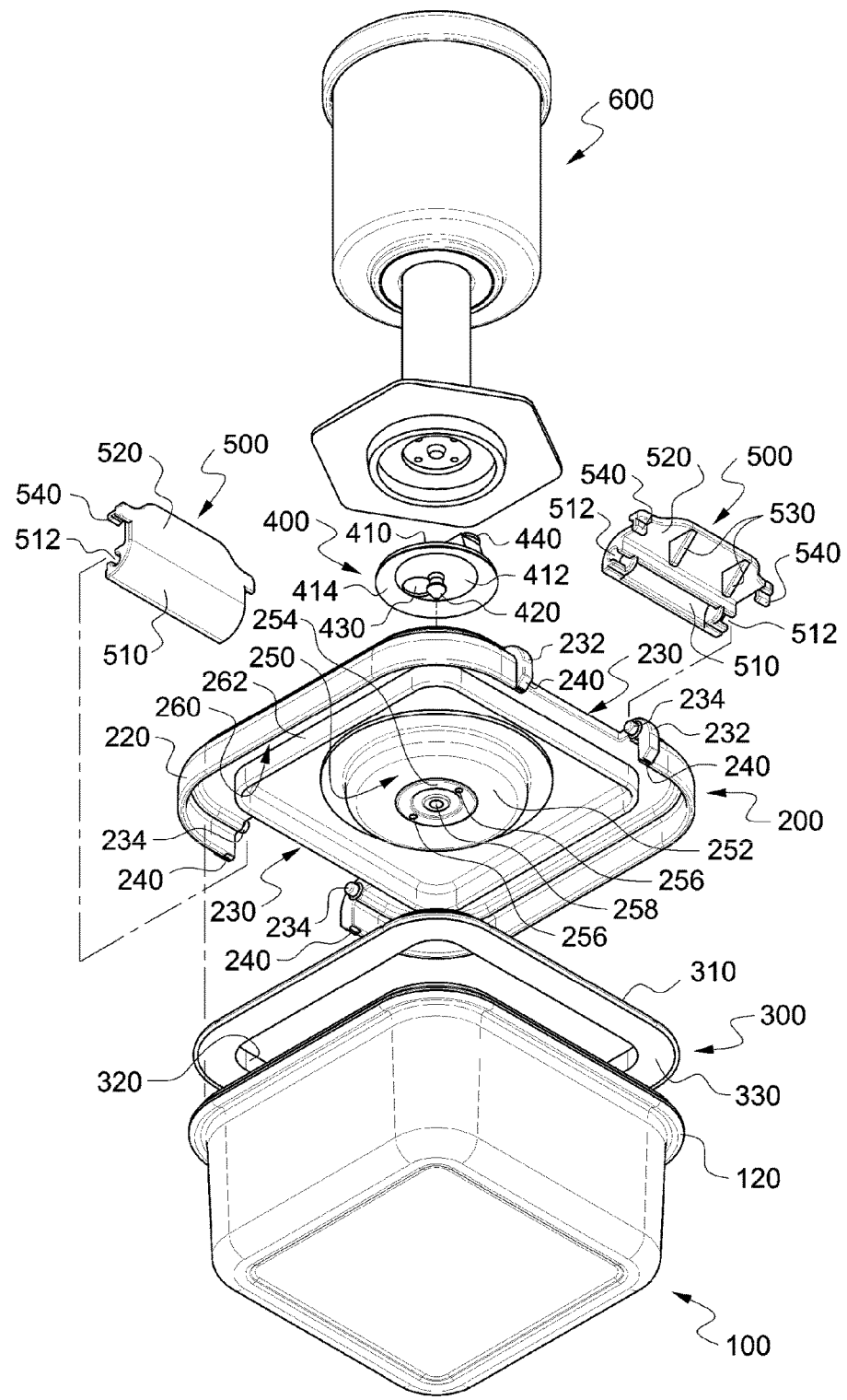
Figure 3:
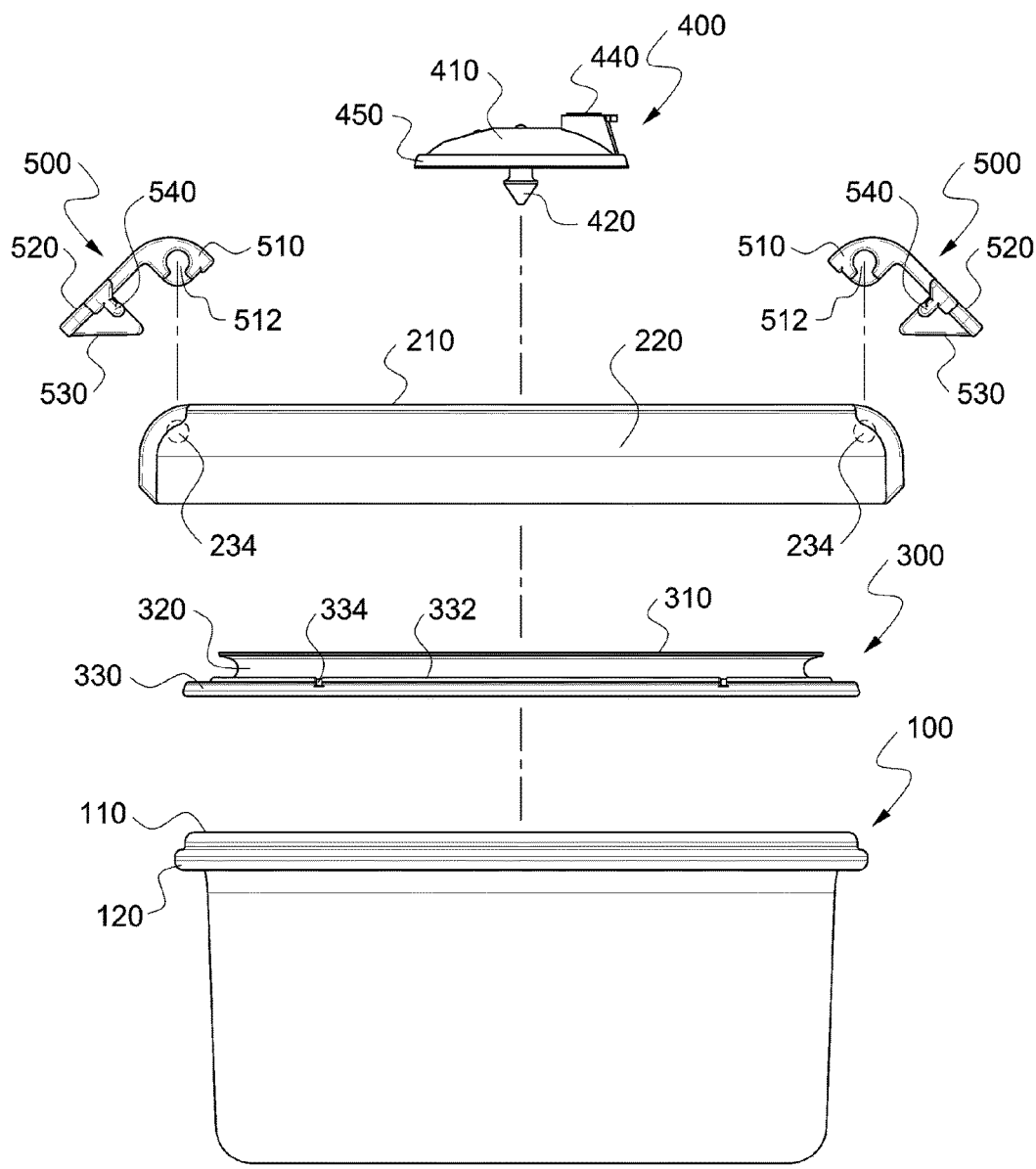

Referring to the attached drawings, detailed description for embodiments of the invention is presented below.

First, a container lid 200 according to a first embodiment of the invention and a container main body 100 having a structure suitable to it are described.

The container main body 100 is enclosed by a bottom and side wall, and provides an open space (for holding contents) on the upper side. On an outer surface near to an opening upper part 110 at a top end of side wall of the container main body 100 is provided main body catching protrusions 120 along horizontal perimeter. The main body catching protrusions 120 does not have to be provided so as to go completely around the opening upper part 110, but it may be provided in a length that is long enough for main body locking protrusions 530 of a protruding bump 440 to be described below to be caught.

The container lid 200 includes a opening cover portion 210 covering the opening upper part 110 of the container main body 100 and a side surface enclosing portion 220 bent at an edge of the opening cover portion 210 and extending downwards so as to enclose a top side surface of the opening upper part 110 of the container main body 100. In the side surface enclosing portion 220 are provided locking-member installing groove 230 that are cut out for installing a locking member 500 in a plurality of segments of same intervals. At both horizontal ends of the locking-member installing groove 230 are provided a pair of locking-member supporting portions 232 strengthened thickly for supporting force applied to the locking member 500, and at corresponding surfaces of inside of the pair of locking-member supporting portions 232 are provided a pair of rotational supporting protrusions 234 that protrude horizontally toward each other. Also, it is preferable to make the corresponding surfaces at both ends of the locking-member installing groove 230 thicker that the rest of the side surface enclosing portion 220 so as to provide supporting force enough for supporting the locking member 500 rotatably. And, at lower portions of the corresponding surfaces at both ends are provided self catching protrusions 240.

The locking member 500 is inserted and installed in the locking-member installing groove 230 rotatably, and has a rotational axle 510 and a locking wing 520. On both right and left ends of the rotational axle 510 are provided protrusion-inserting grooves 512. The rotational axle 510 is supported so that the protrusion-inserting groove 512 is inserted to the rotational supporting protrusions 234 and rotatable to the rotational supporting protrusions 234. The locking wing 520 has a shape similar to the side surface enclosing portion 220, extends so as to fill up the locking-member installing groove 230, and is provided with main body locking protrusions 530 and self-locking protrusions 540 inside. Since the self catching protrusions 240 are provided at both ends of the locking-member installing groove 230, the self-locking protrusions 540 are provided at both right and left ends of the locking wing 520 so as to be paired with the self catching protrusions 240, and the main body locking protrusions 530 may be provided between a pair of right and left self-locking protrusions 540. When the locking member 500 is in a closed state (an outer surface of the locking wing 520 is connected to an outer surface of the side surface enclosing portion 220 in a same height), the main body locking protrusions 530 is configured to be caught at the main body catching protrusions 120 when a pressure difference between inside and outside of the container is weakened (when the negative pressure in the container is weakened), and the self-locking protrusions 540 are press-engaged to the self catching protrusions 240 all the time irrespective of the pressure difference between the inside and outside of the container so as to maintain the closed state of the locking member 500.

In the internal surface of the opening cover portion 210 of the container lid 200 is formed a packing-supporting wall 262 going around the edge, providing the packing-installing groove 260 between the packing-supporting wall 262 and the side surface enclosing portion 220. The packing 300 is installed going around the packing-installing groove 260.

The packing 300 is pressed between the opening upper part 110 of the container main body 100 and the packing-installing groove 260 when the container lid 200 covers the container main body 100, engaging and sealing the contacting surface between the opening upper part 110 and the packing-installing groove 260. The packing 300 includes a container lid suction portion 310 suction-attached to a floor of the packing-installing groove 260, a container main body suction portion 330 disposed below the container lid suction portion 310 and suction-attached to the opening upper part 110 of the container main body 100, and a connecting portion 320 connecting the container lid suction portion 310 and the container main body suction portion 330. It is preferable to make the suction-attaching surface of the container main body suction portion 330 larger and make the size range of applicable container main body 100. Also, on the top surface of the container main body suction portion 330, air-venting slots 334 are provided among fragmented protruding lines 332 in a form of fragments provided in a circumferential direction. The air-venting slot 334 allows air flow between the container main body suction portion 330 and the check valve installing groove 250, so as to prevent each other from being suction-attached.

A check valve installing groove 250 is provided in the packing-supporting wall 262 and on an outer surface of the opening cover portion 210 of the container lid 200. A valve-engaging hole 258 is bored through a middle of the check valve installing groove 250, an air-circulating path 254 cut out in a shape of annular groove so as to enclose the valve-engaging hole 258, and at least one air-venting hole 256 is provided in the air-circulating path 254.

The check valve 400 includes a valve body portion 410 having a shape similar to a caldron lid. The valve body portion 410 includes a concave portion 412 and a suction-sealing portion 414 provided outside the concave portion 412. The concave portion 412 covers a region enclosed by outer circumference of the air-circulating path 254, and an internal surface is almost flat. The suction-sealing portion 414 forms a slope that is bent around an edge of the concave portion 412 and extends obliquely downwards in a radial direction. The reason of forming the suction-sealing portion 414 in a structure of slope or tilted surface is for providing an excellent sealing by preventing the edge of the suction-sealing portion 414 from being lifted from the groove floor 252 when negative pressure is formed in the container and the valve body portion 410 is lowered. In addition, if further providing closed-loop shape edge protrusions 450 on an outer surface of the suction-sealing portion 414 going around along edge, the sealing between the edge of the suction-sealing portion 414 and the groove floor 252 is strengthened. The closed-loop shape edge protrusion 450 has the sealing maintained by supporting the suction-sealing portion 414 so as not to be lifted when negative pressure is formed in the container. The outer surface of the valve body portion 410 has an overall shape of roundly-curved surface, so that it is preferable to form such that the thickness gets smaller as going in a radial direction from the center. In an internal center of the concave portion 412 is provided a fixing portion 420 downwards, so as to have a pointed end and a catching protrusion in the middle. The thickness decreases gradually as going from the center of the concave portion 412 toward the suction-sealing portion 414 in a radial direction, and a part of the concave portion 412 is made as a vacuum-indicating portion 430 formed in a shape of caldron lid with a film having a very small thickness. On the outer surface of the valve body portion 410 is provided a protruding bump 440 protruding upwards.

The entire components forming the check valve 400 are formed with silicon or rubber that has an excellent suction-sealing property.

By press-inserting the fixing portion 420 into the valve-engaging hole 258, the check valve 400 is installed in the check valve installing groove 250. If a user press strongly and release the container lid 200 installed with the check valve 400 in a state of covering the opening upper part of the container main body 100, the check valve 400 allows air to escape to outside but blocks external air entering into the internal space of the container, so that negative pressure is formed in the internal space of the container (detailed mechanism is going to be described below).

Figure 4:
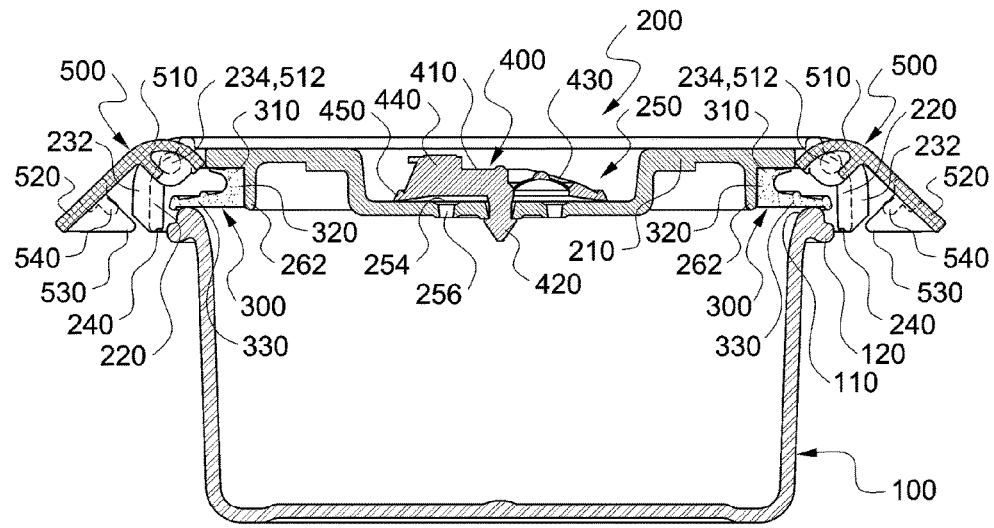
FIGS. 4 to 7 are cross-sectional views for explaining suction-locking mechanisms between the container lid and the container main body, FIG. 4 being in a state that the container lid is put simply on the container main body, FIG. 5 in a state that a force is applied on the container lid vertically downwards, FIG. 6 in a state that a high negative pressure is formed in the internal space of the container by pumping out using a vacuum pump, and FIG. 7 in a state that the negative pressure is weakened in the internal space of the container and the locking member is caught at the container.
Figure 5:
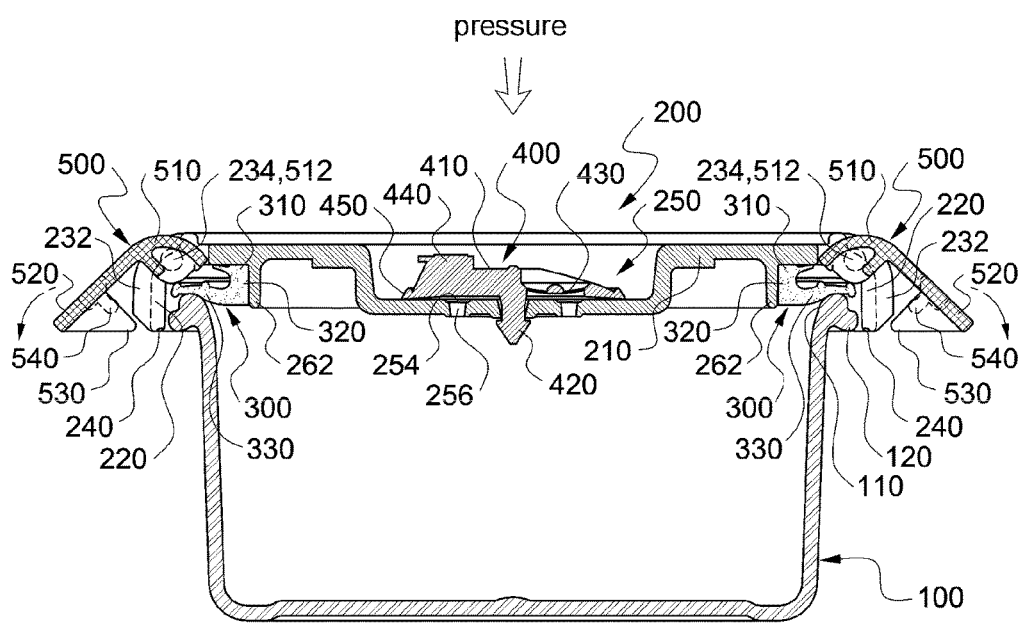
Figure 6:
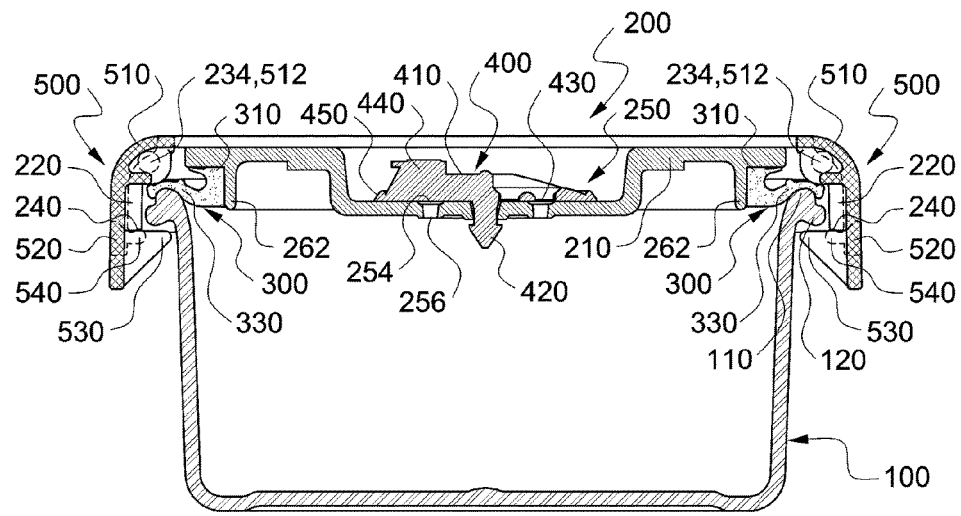
Figure 7:
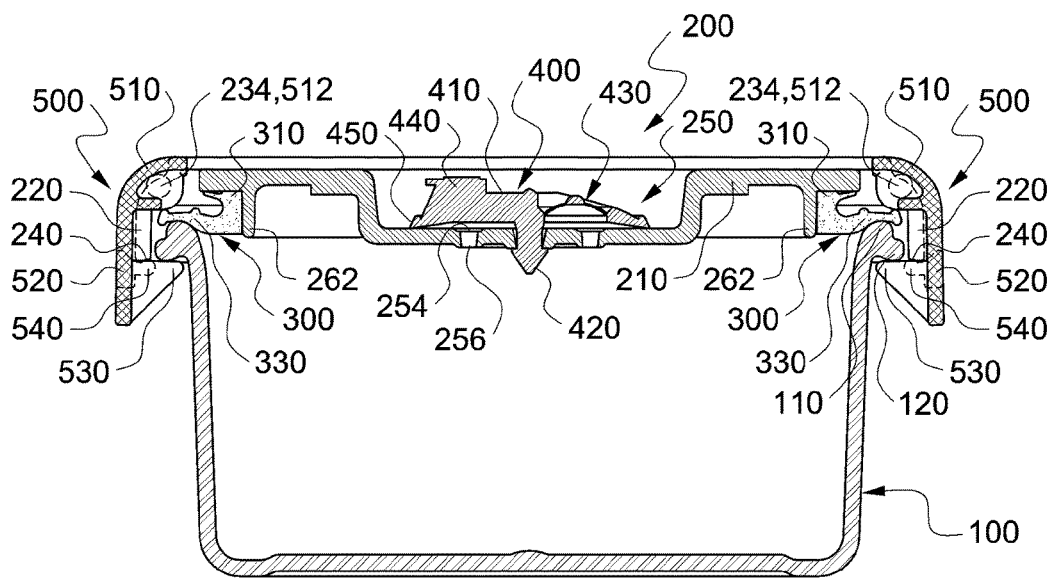
Figure 8:
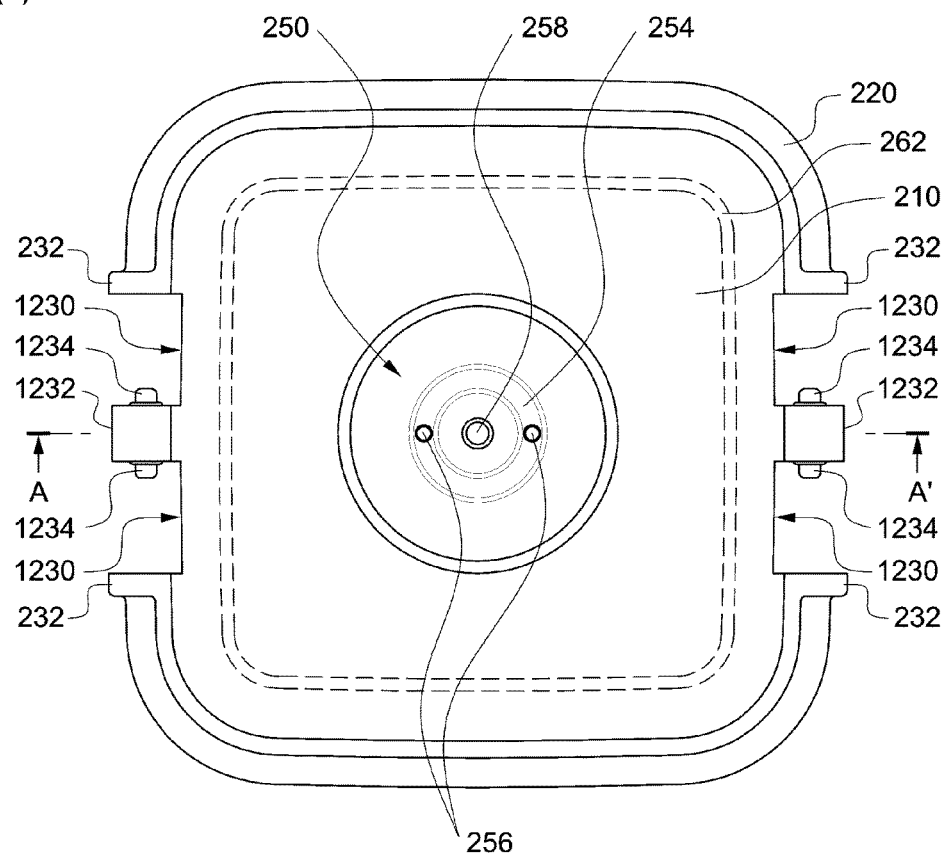
FIGS. 8 to 11 show a container lid according to a second embodiment of the invention, FIGS. 8(a) and 8(b) being a plan view and a cross-sectional view of the container lid main body.
Figure 8:
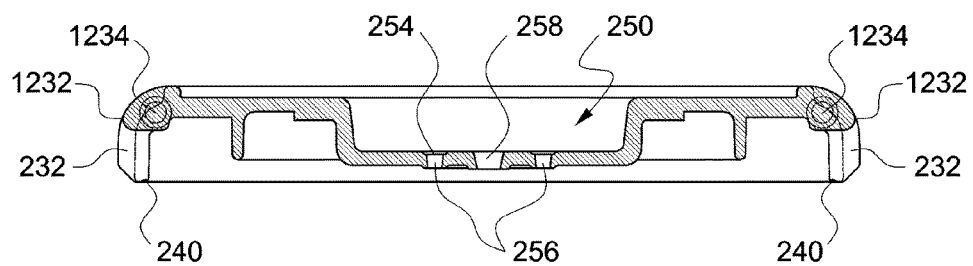

The principle of forming negative pressure in the internal space of the container is described referring to FIG. 4 through FIG. 7 when the container lid 200 installed with the packing 300, the check valve 400, and the locking member 500 covers the container main body 100. FIG. 4 shows an initial state that the container lid 200 is put simply on the container main body 100 and no external force is applied downwards, FIG. 5 shows a state that a force is applied on the container lid vertically downwards, FIG. 6 shows a state that a high negative pressure is formed in the internal space of the container by pumping out using a vacuum pump 600, and FIG. 7 shows a state that the negative pressure is weakened or relieved in the internal space of the container.

First, since there is no pressure difference between the inside and outside of the container in the state (FIG. 4) that the container lid 200 is put simply on the container main body 100, the vacuum-indicating portion 430 keeps the original shape of caldron lid, convex upwards, as it was. If the user pressing down hard vertically on the container lid 200, the packing 300 is press-attached between the packing-installing groove 260 and the opening upper part 110 of the container main body 100 and the contacting surface is sealed, so that a high pressure is formed momentarily in the internal space of the container 100, 200. Since the concave portion 412 of the check valve 400 does not block the air-circulating path 254, air in the container escapes the air-circulating path 254 through the air-venting hole 256 at the moment of applying of such a high pressure, and the pressure of the escaping air is high enough to lift the suction-sealing portion 414 attached to the groove floor 252 outside of the air-circulating path 254, so that the air escapes outside. If the air escapes and relieve the pressure difference between the inside and outside of the container, the suction-sealing portion 414 is attached to the groove floor 252 again (refer to FIG. 5). These processes occur in a very short time. In the state of FIG. 5, the volume of the internal space of the container 100, 200 is smaller than in that of FIG. 4. If the user removes the external force, the packing 300 expands with a self-elasticity and pushes up the container lid 200 a little, so that the volume of the internal space of the container increases a little. Since the internal space of the container increases its volume without introducing air, negative pressure is formed in the internal space of the container, and the suction-sealing portion 414 is suction-attached more strongly to the groove floor 252, blocking air flow through the contacting surface. The packing 300 may expand but guarantees sealing between the packing-installing groove 260 and the opening upper part 110 of the container main body 100. Therefore, the condition of negative pressure in the internal space of the container is maintained, and the film of the vacuum-indicating portion 430 changes its shape to convex downwards as shown in FIG. 5 by the pressure difference between the inside and outside of the container.

If negative pressure is formed in the internal space of the container by the user's pressing down the container lid 200 as shown in FIG. 5, the container lid 200 is attached very strongly to the container main body 100, so that the user almost cannot detach the container lid 200 from the container main body 100 with fingers. However, as discussed in regard to the prior arts in the above, the negative pressure in the internal space of the container may be weakened slowly or quickly due to various factors (for example, the packing 300 and/or the check valve 400 cannot attach to the contacting surface completely due to debris or incomplete installation). In order to prevent the container lid 200 from disengaging form the container main body 100 even when holding the container lid 200 only and lifting up the container 100, 200 in a state that negative pressure is not enough in the internal space of the container, it is preferable to lock the locking member 500.

If the user closes the locking member 500 by rotating in the state of FIG. 5, the self-locking protrusions 540 of the locking member 500 are press-inserted to the self catching protrusions 240, and at the same time the main body locking protrusions 530 of the locking member 500 engages loosely to the main body catching protrusions 120 or is positioned below the main body catching protrusions 120 with a little gap without being caught. The reason of designing that way is that since the height of the locking member 500 fixed to the container lid 200 changes according to the magnitude of negative pressure in the internal space of the container it is preferable to have the main body locking protrusions 530 positioned below the main body catching protrusions 120 when a high negative pressure is formed in the internal space of the container, and to ascend and be caught at the main body catching protrusions 120 when the negative pressure is weakened or relieved.

If extracting air from the internal space of the container further, the degree of vacuum of the internal space of the container gets heightened and it is possible to deter the spoiling speed of food in the container. For this, if the pressure in an empty space between the check valve installing groove 250 and the vacuum pump 600 is lowered than the internal space of the container by pumping the vacuum pump 600 in a state of covering the top of the check valve installing groove 250, the check valve 400 provides an air venting path through which the air in the internal space of the container is extracted from the air-venting hole 256 and the air-circulating path 254 due to the weakening of sealing between the check valve installing groove 250 and the groove floor 252. That is, the air escaping through the air-venting hole 256 and the air-circulating path 254 lifts the suction-sealing portion 414 of the check valve 400 escapes to the empty space of the check valve installing groove 250, and is extracted to outside through the vacuum pump 600. By this the stronger negative pressure is formed in the internal space of the container, and the container lid 200 presses against the packing 300 and is drawn more strongly toward the container main body 100 (the vacuum pump 600 is not a component forming the invention directly, and since it is described in Korean Patent Application Publications 10-2003-0016080 and 10-2008-0014536, the explanation is omitted here). FIG. 6 shows a state that a negative pressure is formed more strongly in the internal space of the container, and in this state the main body locking protrusions 530 of the locking member 500 are not caught at the main body catching protrusions 120 always, but are away from it. The vacuum-indicating portion 430 of the check valve 400 is also suction-attached downwards more strongly.

Then, for various reasons, the high negative pressure state in the container of FIG. 6 gets weakened gradually, the packing 300 expands according to the magnitude of the weakened negative pressure, pushing the container lid 200 upwards, so that as shown in FIG. 7 the main body locking protrusions 530 are caught at last at the main body catching protrusions 120 or more securely. If the negative pressure in the container is weakened in this state, the packing 300 expands according to the magnitude of weakened negative pressure and pushes the container lid 200 upwards, so that the main body locking protrusions 530 are caught at last at the main body catching protrusions 120 or more securely. Due to such a being caught between the main body locking protrusions 530 and the main body catching protrusions 120, even though the negative pressure in the internal space of the container is weakened or relieved, as long as the user rotates the locking member 500 forcefully and open it, the container lid 200 is not disengaged from the container main body 100, getting rid of problems such as spilling.

Since the main body locking protrusions 530 are not caught at the main body catching protrusions 120 necessarily when closing the locking member 500, the applicable container main body 100 is not limited to a single size or structure (especially with respect to the main body catching protrusions 120), but the range of applicable container main body 100 is wide. Also, since the self-locking protrusions 540 are press-inserted to the self catching protrusions 240 when closing the locking member 500, even in a state that the main body locking protrusions 530 are not caught at the main body catching protrusions 120 (that is, irrespective of whether the main body locking protrusions 530 are caught at the main body catching protrusions 120 or not), the locking member 500 is not loose but held stably to be closed.

Embodiments of Invention

In a first embodiment, the structure of the locking member 500 and the corresponding structure of the locking-member installing groove 230 can be varied as in second and third embodiments to be described below.

Figure 9:
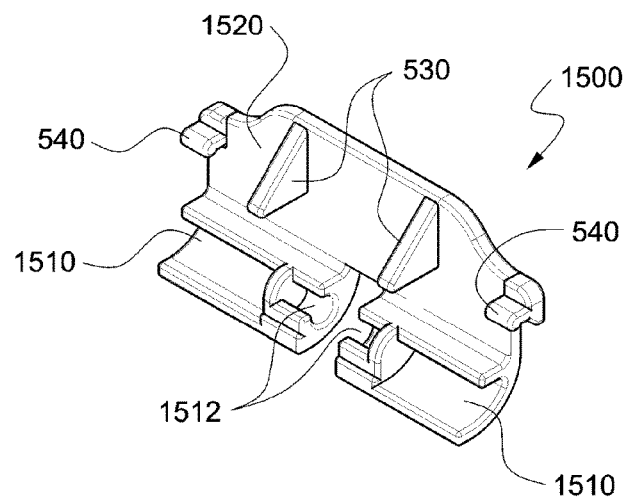
Figure 10:
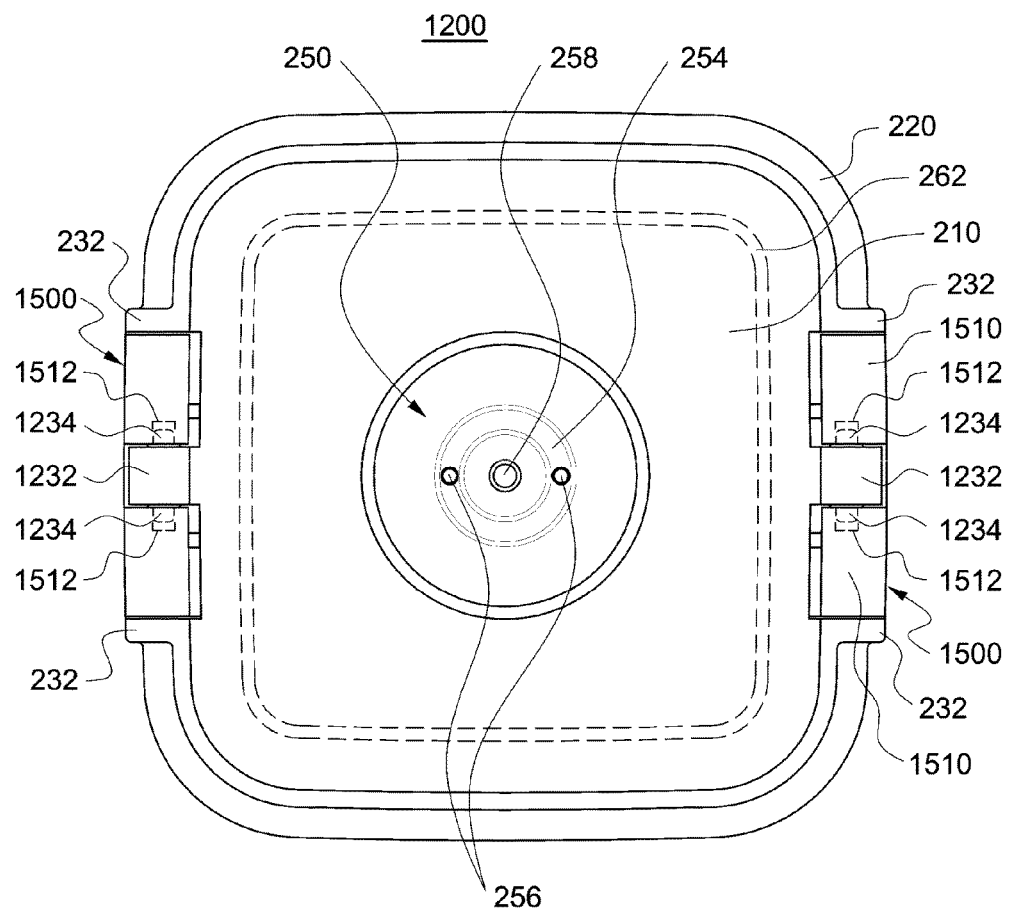
Figure 11:
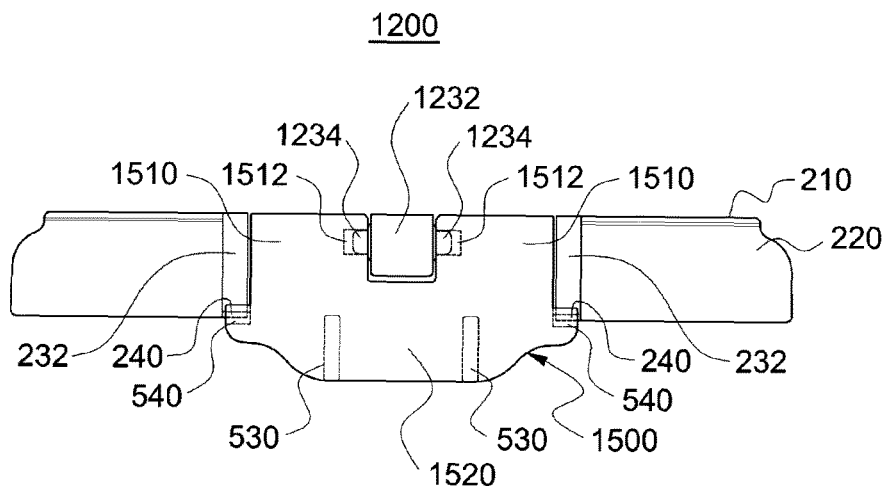

First, referring to FIGS. 8 to 11, a container lid 1200 according to the second embodiment of the invention is described. FIGS. 8(a) and (b) are a plan view and a cross-sectional view of the container lid 1200, FIG. 9 is a perspective view showing a locking member 1500, and FIGS. 10 and 11 are a plan view and a side view of the container lid 1200 in a closed state after installing the locking member 1500 in the container lid 1200. Since the difference of the container lid 1200 of the second embodiment from the container lid 200 of the first embodiment lies in the locking member 1500 and its installing structure, in order to avoid complication of figures, the packing 300 and the check valve 400 are not shown.

The container lid 1200 according to the second embodiment, when compared to the container lid 200 of the first embodiment, has a difference in the structures of the locking-member installing groove 1230 and the locking member 1500. In two segments (locking-member installing segments) corresponding to the entire length of the locking member 1500 in the side surface enclosing portion 220 of the container lid 1200 (may include a part of edge of the opening cover portion 210) are provided the locking-member supporting portion 1232 and a pair of locking-member installing groove 1230. The locking-member supporting portion 1232 extends by a specific length side by side with the side surface enclosing portion 220 at an edge of the opening cover portion 210 of a part of segment in the locking-member installing segments, and the pair of locking-member installing grooves 1230 are prepared in a form of cutting out remaining segments on both sides of the locking-member supporting portion 1232. Also, on both opposite sides of circumferential direction of the locking-member supporting portion 1232 are provided a pair of rotational axle supporting protrusions 1234 protruding in opposite circumferential directions. Also, the self catching protrusions 240 are provided on both sides of the locking-member installing segments, that is, at lower ends of both side surfaces disposed farthest from each other in the locking-member installing groove 1230 as in the first embodiment.

Corresponding to such a structure of the locking-member installing groove 1230 and the locking-member supporting portion 1232, a pair of rotational axles 1510 and locking wings 1520 bent at the pair of the rotational axle 1510 and extending side by side with the side surface enclosing portion 220 are provided. The pair of rotational axle 1510 is provided with a pair of protrusion inserting grooves 1512, which are disposed in line while being away by a distance corresponding to a part of segment in the locking-member installing segments, received in a pair of locking-member installing grooves 1230 respectively, and inserted to the pair of rotational axle supporting protrusions 1234 on facing surfaces, so that the locking member 1500 is supported rotatably. A portion of the locking wing 1520 corresponding to the locking-member supporting portion 1232 is bored so as to be inserted to the locking-member supporting portion 1232 and the entirety is made of a single body, and when the locking wing 1520 is rotated and closed, the cut-out portion is inserted to the locking-member supporting portion 1232 and the pair of the rotational axle supporting protrusions 1234. In the internal surface of the locking wing 1520 are formed the self-locking protrusions 540 and the main body locking protrusions 530 as in the first embodiment.

Opening and closing operations of the container lid 1200 according to the second embodiment are equivalent to those of the container lid 200 of the first embodiment. That is, if the user applies a force for rotating and closing the locking wing 1520, the locking member 1500 is supported by the rotational axle supporting protrusion 1234, being rotated and closed. When it is closed, the self-locking protrusions 540 is press-engaged to the self catching protrusions 240, and the main body locking protrusions 530 are positioned at a lower portion of the main body catching protrusions 120, and as the negative pressure in the internal space of the container is weakened it ascends and is caught at the main body catching protrusions 120.

Figure 12:
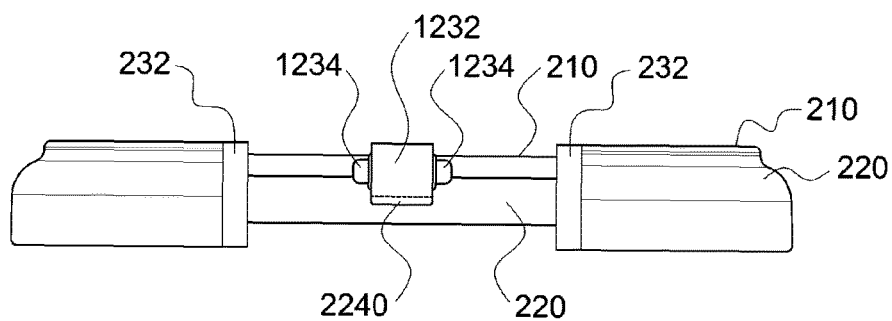
FIGS. 12 to 14 show a container lid according to a third embodiment of the invention, FIG. 12 being a side view of a container lid main body, FIG. 13 a perspective view of the locking member, and FIG. 14 a side view of the container lid in a state that the locking member is installed in the container lid main body and the container lid is closed.
Figure 13:
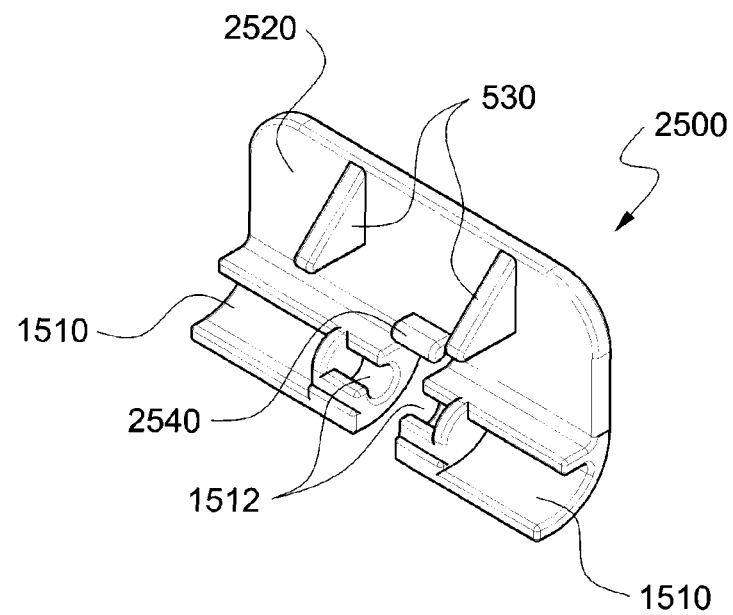
Figure 14:
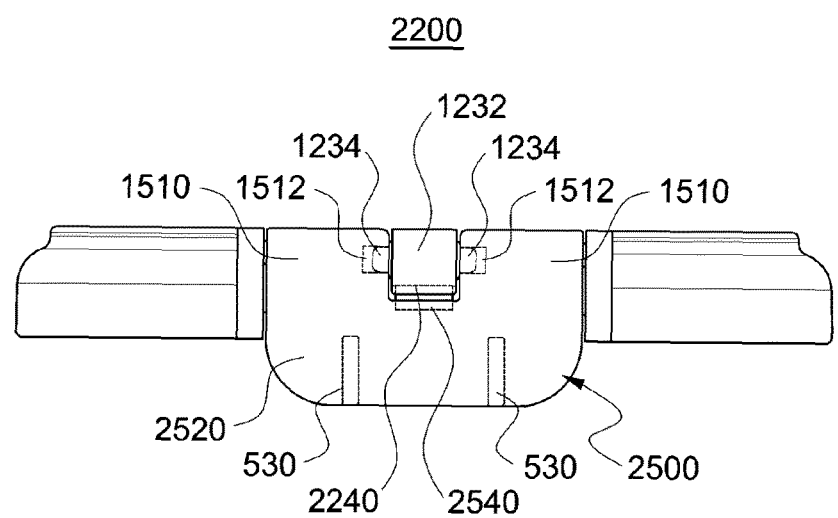

Next, referring to FIGS. 12 to 14, a container lid 2200 according to a third embodiment of the invention is described. FIG. 12 is a side view of a main body of container lid 2200, FIG. 13 is a perspective view of the locking member 2500, and FIG. 14 is a side view of the container lid 2200 in a state of installing the locking member 2500 in the main body of the side surface enclosing portion 220 and then being closed. As in the second embodiment, in order to avoid complication in FIGS. 12 to 14, the packing 300 and the check valve 400 are not shown.

The difference of container lid 2200 of the third embodiment from the container lid 1200 of the second embodiment is that the self catching protrusions 2240 provided in the main body of the container lid 2200 is moved and provided in the lower portion of the locking-member supporting portion 1232, and at the same time the position of the self-locking protrusions 2540 of the locking member 2500 is moved and disposed in the middle of the locking wing 2520 so as to be caught with the self catching protrusions 2240. The rest of structures are same as in the second embodiment.

Other embodiments may be possible even though not shown. For example, the locking-member installing groove 230, the rotational supporting protrusions 234, the rotational axle 510, the protrusion-inserting groove 512, and the main body locking protrusions 530 are made same as in the first embodiment, and only the self catching protrusions 2240 and the self-locking protrusions 2540 are made same as in the third embodiment.

Even though the container lid 200, 1200, 2200 are described using examples using with the container main body 100 made accordingly, but the container lid 200, 1200, 2200 of the invention may be used as vacuum-sealing lid for various containers being used already.

Figure 15:
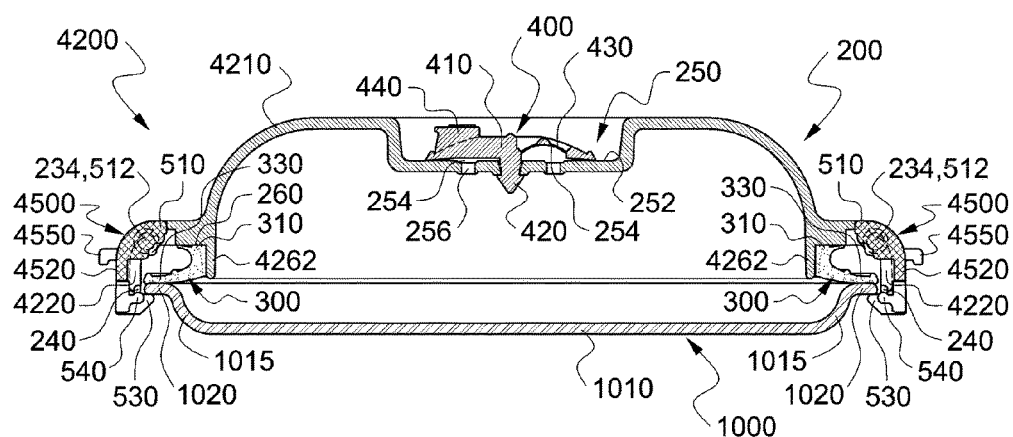
FIG. 15 shows using a container lid according to a fourth embodiment of the invention to a regular dish-type container, (a) showing a state that no negative pressure is formed, and (b) a state that a strong negative pressure is formed in the internal space of container.
Figure 15:
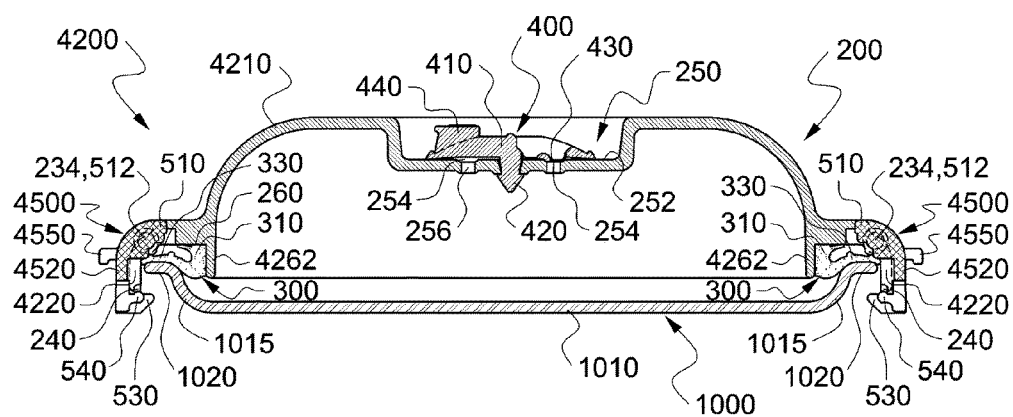

FIG. 15 shows a case of using the container lid 4200 according to a fourth embodiment as a vacuum-sealing lid for the containers, which is as flat as a plate 1000 with the opening top part 1020 pointing in a direction close to horizontal or horizontal direction. Since the plate 1000 usually has a flat shape with small height difference between the floor 1010 and the opening top part 1020 at the top of the tilting portion 1015 but food arises higher than the height of the plate 1000 frequently, considering it, the opening cover portion 4210 of the container lid 4200 for plate may be preferably made in a form having a risen form than the side surface enclosing portion 4220 so as to provide a sufficient receiving space for food (a shape of upturned bowl). The packing supporting walls 4262 are provided inside the tilting portion 1015 of the plate 1000, and the packing 300 is provided between them. The structure and relation between the locking member and the locking-member installing groove can be made according to any one of the previous embodiments.

However, the locking member 4500 of the container lid 4200 according to the fourth embodiment needs to be changed with some structure considering the low container main body 100. When determining the extended length from the rotational axle 510 of the locking wing 4520 of the locking member 4500, it is preferable to determine the length so as to be able to dispose the main body locking protrusions 530 as low as possible in a range in which the locking wing 4520 does not touch the floor surface on which the plate 1000 is put, when rotating and closing the locking member 4500. It is preferable to provide the side surface enclosing portion 4220 in a corresponding length. If providing the locking wing 4520 and the side surface enclosing portion 4220 as such, a gap too small for a finger to enter is provided between the floor surface on which the plate 1000 is put and the lower end of the locking wing 4520 and the side surface enclosing portion 4220, so that it might be inconvenient to lift the plate 1000 engaging with the container lid 4200. In order to solve such an inconvenience, preferably a handle 4550 may be provided in a form protruding horizontally on an outer surface of the locking wing 4520. The user may lift the entire container by hook a finger in the handle 4550 or holding the handle 4550 conveniently.

Also, in a regular plate 1000, there is no separate catching protrusion such as the main body catching protrusions 120. Instead, since the plate 1000 is provided with the opening top part 1020 in a form extending horizontally or close to horizontally, the opening top part 1020 may be used as the main body catching protrusions 120. FIG. 15(a) shows a state of putting the container lid 4200 simply on the plate 1000, and FIG. 15(b) shows a state of closing the locking member 4500 by pressing down vertically and release the container lid 4200 and forming negative pressure in the internal space between the plate 1000 and the container lid 4200.

In the state of FIG. 15, since the container lid 4200 is simply put on the plate 1000, the packing 300 is not under pressure and the container main body suction portion 330 is just put on the opening top part 1020 of the plate 1000. If closing the locking member 4500 in such a state, the self-locking protrusions 540 is press-engaged to the self catching protrusions 240, and the main body locking protrusions 530 are caught loosely at the opening top part 1020 of the plate 1000. Of course, according to a shape of plate 1000, the main body locking protrusions 530 may be positioned below with a small gap without being caught at the opening top part 1020. In such a state, if the user pushes the container lid 4200 downwards vertically and releases, air in the internal space defined by the plate 1000 and the container lid 4200 escapes to outside through the check valve 400, and then negative pressure is formed in the internal space of the container as the packing that was pressed a lot expands a little. In this state, as shown in FIG. 15(*b*), the check valve 400 and the packing 300 are suction-attached to the check valve installing groove 250 and the packing-installing groove 260 contacting respectively, sealing the contacting surfaces. Here, the main body locking protrusions 530 does not touch the opening top part 1020 of the container main body 100 and falls downwards. After that, if the packing 300 expands because the negative pressure formed in the internal space of the plate 1000 and the container lid 4200 weakened or relieved, the main body locking protrusions 530 arise and are caught at the opening top part 1020 of the plate 1000. The opening top part 1020 performs the function of catching protrusions instead. By this, even though the negative pressure formed in the internal space of the container gets weakened, the container lid 4200 is not disengaged from the plate 1000.

Figure 16:
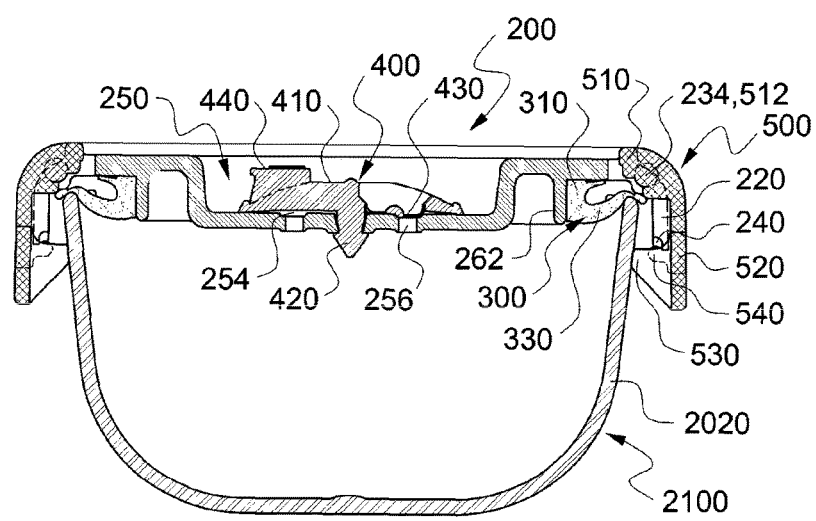
FIGS. 16(a) and 16(b) show an engaging state of a container lid according to, which is used for regular circular and rectangular bowl-type containers.
Figure 16:
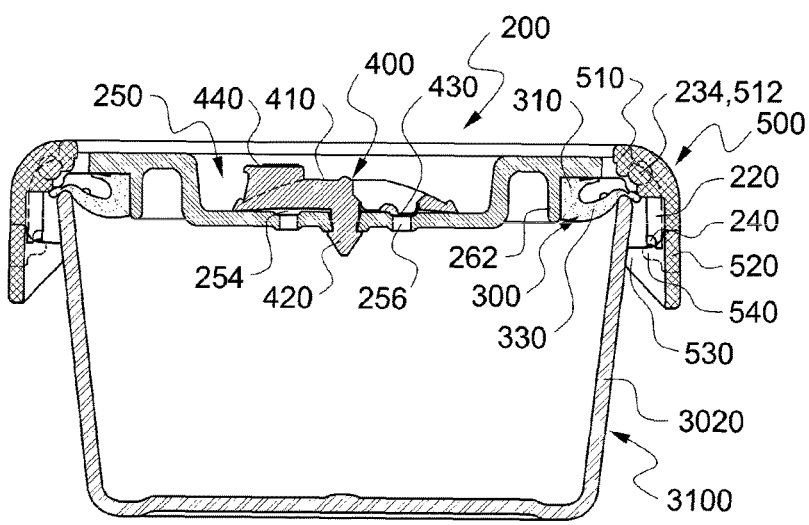

Next, FIG. 16 shows that the container lid 200 of the invention can be applied to bowl-type container which has deep internal space and in which the side wall 2020, 3020 has a tilting surface that is nearly vertical. FIG. 16(*a*) shows an example, in which the container lid 200 is used with the bowl-type containers 2100 having a circular opening upper part, and FIG. 16(*b*) shows an example, in which the container lid 200 is used with the bowl-type container 3100 having a rectangular opening upper part. When closing the locking member 500 in a state of negative pressure formed in the internal space of the container main body 2100, 3100, the main body locking protrusions 530 are put loosely on the side wall 202, 3020 of the bowl-type container main body 2100, 3100 or disposed with a gap, and when the negative pressure is weakened or relieved the container lid 200 arises by the expansion of the packing 300, so that the main body locking protrusions 530 are caught at the side wall 2020, 3020 of the container main body 2100, 3100. By this, irrespective of whether negative pressure is formed in the container or not, the container lid 200 is maintained to engage the container main body 2100, 3100 all the time. Of course, the container lids 1200, 2200, 4200 of the other embodiments can be applied to such bowl-type containers.

The descriptions of the invention in the above are just for embodiments of the invention. One skilled in the field of arts may change and modify the invention variously without leaving the spirit and scope of the invention claimed in the claims below. Therefore, all the changes that are equivalent or inclusive to the claims of the invention belong to the scope of the invention.

INDUSTRIAL APPLICATIONS

The present invention may be applied widely to various containers with top opening for holding contents such as food. Also, since in a case of urns for remains, if a high vacuum is applied inside, it is very efficient to prevent decomposition of the remains, the invention may be applied to manufacturing of lid or main body of urn.

The invention claimed is:

1. A container lid for vacuum sealing for maintaining negative pressure in an internal space provided by covering an opened top portion of a container main body and seals, the container lid comprising:
   a packing-installing groove provided around an internal surface of a lid main body for covering an open upper part of the container main body;
   a closed-loop shape packing installed in the packing-installing groove and sealing a contacting surface by press-fitting between an opening part of the container main body and the packing-installing groove;
   a check valve installing part provided on an external surface of the lid main body and within the perimeter of the packing-installing groove;
   a check valve installed in the check valve installing part and configured for generating negative pressure in the internal space of the container by allowing air inside the container to flow to the outside but preventing outside air from flowing into the container when a pressure difference occurs between the inside and outside of the container in a state that the container lid covers and seals an open upper part of the container main body;
   a plurality of self catching protrusions provided at two or more portions of an edge of the container lid; and
   a plurality of locking members, each of which are installed rotatably in portions of the edge of the lid main body neighboring the plurality of the self catching protrusions,
   wherein each of the plurality of locking members comprises main body locking protrusions preventing the container lid from being detached from the container main body by latching to an edge of the container main body when the negative pressure in the internal space of the container is weakened in a closed state, and a self-locking protrusion preventing the locking member from opening by being press-fitted and engaging the self catching protrusion in the above closed state.

2. The container lid for vacuum sealing of claim 1, wherein the container lid is configured, while a pressure difference between the internal space of the container and an outside of the container in maintained, for pressing down on the packing with a force corresponding to the pressure difference and being press-fitted to the open top part of the container main body.

3. The container lid for vacuum sealing of claim 1, wherein the lid main body is provided with the packing-installing groove and the check valve installing part respectively in an edge circumference of an inner surface and in a edge circumference of an outer surface, and comprises an opening cover portion covering an open upper part of the container main body, a locking-member installing portion bent at an edge of the opening cover portion, extending downwards, enclosing an outer side surface of the opening part portion of the container main body, and enabling the installation of the plurality of locking-members at least at two locations, and a side surface enclosing portion provided with the self catching protrusions.

4. The container lid for vacuum sealing of claim 3, wherein the locking-member installing portion comprises a locking-member installing groove provided in a form in which a section corresponding to a length of the locking member is cut out from the side surface enclosing portion and a pair of rotational axle supporting protrusions protruding in a circumferential direction from two facing side surfaces of the locking-member installing groove facing each other,
   wherein the locking member comprises a rotational axle supported rotatably by a pair of protrusion-inserting groove provided at both ends inserted respectively by the pair of rotational axle supporting members, and a locking wing that is bent at the rotational axle, extending side by side with the side surface enclosing portion, and formed with the self-locking protrusions and the main body locking protrusions inside.

5. The container lid for vacuum sealing of claim 4, wherein the locking-member installing portion further comprises a pair of locking-member supporting portions provided on both side surfaces facing each other in a circumferential direction with respect to the locking-member installing groove in thick and strengthened forms so as to withstand force applied to the locking member, wherein the pair of the rotational axle supporting protrusions are provided on two facing inner surfaces of the pair of the locking-member supporting portions, and the self catching protrusions are provided respectively at lower ends of the pair of locking-member supporting portions.

6. The container lid for vacuum sealing of claim 3, wherein the locking-member installing portion comprises a locking-member supporting portion extending by a specific length side by side with the side surface enclosing portion from an edge of the opening part covering portion in a partial section of a section of the side surface enclosing portion corresponding to a length of the locking member, a pair of locking-member installing grooves provided in forms of cutting out a remaining sections on both sides of the locking-member supporting portion, and a pair of rotational axle supporting protrusions protruding in opposite circumferential directions from two opposing side surfaces in circumferential direction of the locking-member supporting portion,
wherein the locking member comprises a pair of rotational axle aligned with an interval corresponding to a distance of the partial middle section, received in the pair of locking-member installing grooves respectively, inserted to the pair of rotational axle supporting protrusions on facing surfaces, and enabling the locking member to rotate, and a locking wing bent at the pair of the rotational axles, extending side by side with the side surface enclosing portion, having a bored portion corresponding to the locking-member supporting portion and being of one body, wherein the self-locking protrusions and the main body locking protrusions are formed on an inner surface.

7. The container lid for vacuum sealing of claim 6, wherein the self catching protrusions are provided at least one of lower ends of both farthest side surfaces of the locking-member installing grooves or lower ends of the locking-member supporting portion.

8. The container lid for vacuum sealing of claim 1, wherein the locking member further comprises a handle provided by protruding horizontally on an external surface so as to pull up the container lid by hooking a finger.

9. The container lid for vacuum sealing of claim 1, wherein if a high pressure is formed in an internal space of the container by lowering the container lid with an external force and press-fitting on the opening part portion of the container main body, the check valve provides an air venting path so as to allow air in the internal space of the container escape to outside of the container, and if the external force is removed, the packing expands with its own elasticity pushing up the container lid and forming negative pressure in the internal space of the container, and the check valve is sucked on a surface of the check valve installing portion closing the air venting path so as to maintain the negative pressure in the internal space of the container, and at the same time the container lid presses down on the packing due to the pressure difference between the internal space and outer space of the container, so as to be suction-engaged strongly to the opening part portion of the container main body.

10. The container lid for vacuum sealing of claim 1, wherein in a state of sealing an empty space formed by enclosing the check valve and the check valve installing portion and covering, when a pressure in the empty space is lowered below a pressure of the internal space of the container by pumping with a vacuum pump, configured such that the check valve provides an air venting path due to weakening of the press-fitting force with a surface of the check valve installing portion and air in the internal space of the container escapes into the empty space through the air venting path and is vented out to the outside of the container through the vacuum pump, so as to form a larger negative pressure in the internal space of the container.

11. The container lid for vacuum sealing of claim 1, wherein a main body catching protrusion is provided near to an external surface opening part of the container main body so that the main body locking protrusions can be caught by the main body catching protrusion when a negative pressure in the internal space of the container is relieved.

12. The container lid for vacuum sealing of claim 1, wherein the container main body is a dish having an opening part with an edge that is a tilted surface extending sideways so that the main body locking protrusions can be caught by the edge of the opening part when a negative pressure in the internal space of the container is relieved.

13. The container lid for vacuum sealing of claim 1, wherein the container main body is a bowl having a side wall and a top opening part that is a tilted surface extending upwards so that the main body locking protrusions can be caught by the outer surface of the opening part when a negative pressure in the internal space of the container is relieved.

14. The container lid for vacuum sealing of claim 1, wherein the check valve comprises a valve body portion having an outer surface resembling a caldron lid and an inner surface having a suction-sealing portion including a concave portion disposed in a center and having a specific area and a tilting surface bending from an edge of the concave portion and extending obliquely downwards, a vacuum-indicating portion formed convexly upwards in a form of thin film on a partial region of the concave portion, a protruding bump protruding upwards on an outer surface of the valve body portion, and a fixing portion extending downwards in a center of the internal space of the concave portion and having a latching bump formed in a middle, and wherein the entire container lid is formed monolithically using silicon or rubber.

15. The container lid for vacuum sealing of claim 14, wherein the vacuum-indicating portion collapses downwards convexly while the negative pressure is formed in the internal space of the container.

16. The container lid for vacuum sealing of claim 14, wherein the thickness of the valve body portion decreases in a radial direction from the center of the concave portion and the suction-sealing portion comprises closed-loop shape edge protrusions that increase a suction-sealing force around an edge of the outer surface.

17. The container lid for vacuum sealing of claim 14, wherein the check valve-installing portion has a form of concave groove for installing the check valve, wherein a valve-engaging hole to which the fixing portion is pressed in and fixed, an air-circulating path having a shape of annular groove enclosing the valve-engaging hole, and an air-venting hole bored from inside of the air-circulating path to the internal space of the container are provided in a bottom of groove of the check valve-installing portion, and wherein when there is negative pressure in the internal space of the container, the concave portion of the check valve covers top of the air-circulating path and its inner region while staying away therefrom, and the suction-sealing portion is sucked and attached to a floor surface of the check valve-installing portion outside the air-circulating path, sealing the attaching surface.

18. A vacuum sealing container comprising:
   a container main body having an open upper part, providing a receiving space inside, and provided with a main body catching protrusion on an outer surface besides an opening part; and
   a container lid for forming negative pressure in an internal space provided by covering the open upper part of the container main body for sealing,
   wherein the container lid comprises:
   a packing-installing groove provided so as to go around an internal surface of a lid main body for covering an open upper part of the container main body;
   an closed-loop shape packing installed in the packing-installing groove and sealing contacting surface by press-fitting between an opening part of the container main body and the packing-installing groove;
   a check valve installing part provided on an external surface of the lid main body and within the perimeter of the packing-installing groove;
   a check valve installed in the check valve installing part and configured for generating negative pressure in the internal space of the container by allowing air inside the container to flow to the outside but preventing outside air from flowing into the container when a pressure difference occurs between the inside and outside of the container in a state that the container lid covers and seals an open upper part of the container main body;
   a plurality of self catching protrusions provided at two or more portions of an edge of the container lid; and
   a plurality of locking members, each of which are-installed rotatably in portions of the edge of the lid main body neighboring the plurality of the self catching protrusions,
   wherein each of the plurality of locking members comprises a main body locking protrusions preventing the container lid from being detached from the container main body by the packing's expanding and pushing the container lid upwards and latching to the main body catching protrusion as the negative pressure in the internal space of the container is weakened in a closed state, and a self-locking protrusion preventing the locking member from opening by being press-fitted and engaging the self catching protrusion in the above closed state.

19. A container lid for vacuum sealing for maintaining negative pressure in an internal space provided by covering an opened top portion of a container main body and seals, the container lid comprising:
   a packing-installing groove provided so as to go around an internal surface of a lid main body for covering an open upper part of the container main body;
   a closed-loop shape packing installed in the packing-installing groove and sealing contacting surface by press-fitting between an opening part of the container main body and the packing-installing groove;
   a check valve installing part provided on an external surface of the lid main body and within the perimeter of the packing-installing groove;
   a check valve installed in the check valve installing part and configured for generating negative pressure in the internal space of the container by allowing air inside the container to flow to the outside but preventing outside air from flowing into the container when a pressure difference occurs between the inside and outside of the container in a state that the container lid covers and seals an open upper part of the container main body;
   a plurality of self catching protrusions provided at two or more portions of an edge of the container lid; and
   a plurality of locking members, each of which being installed rotatably in portions of the edge of the lid main body neighboring the plurality of the self catching protrusions,
   wherein each of the plurality of locking members comprises a main body locking protrusions preventing the container lid from being detached from the container main body by latching to an edge of the container main body when the negative pressure in the internal space of the container is weakened in a closed state, and a self-locking protrusion preventing the locking member from opening by being press-fitted and engaging the self catching protrusion in the above closed state,
   wherein the container lid is configured, while a pressure difference between the internal space of the container and an outside of the container in maintained, for pressing down on the packing with a force corresponding to the pressure difference and being press-fitted to the open top part of the container main body, and
   wherein the lid main body is provided with the packing-installing groove and the check valve installing part respectively in an edge circumference of an inner surface and in a edge circumference of an outer surface, and comprises an opening cover portion covering an open upper part of the container main body, a locking-member installing portion bent at an edge of the opening cover portion, extending downwards, enclosing an outer side surface of the opening part portion of the container main body, and enabling the installation of the plurality of locking-members at least at two locations, and a side surface enclosing portion provided with the self catching protrusions.

20. The container lid for vacuum sealing of claim 19, wherein the locking-member installing portion comprises a locking-member installing groove provided in a form in which a section corresponding to a length of the locking member is cut out from the side surface enclosing portion and a pair of rotational axle supporting protrusions protruding in a circumferential direction from two facing side surfaces of the locking-member installing groove facing each other,
   wherein the locking member comprises a rotational axle supported rotatably by a pair of protrusion-inserting grooves provided at both ends inserted respectively by the pair of rotational axle supporting members, and a locking wing that is bent at the rotational axle, extending side by side with the side surface enclosing portion, and formed with the self-locking protrusions and the main body locking protrusions inside.

21. The container lid for vacuum sealing of claim 19, wherein the locking-member installing portion comprises a locking-member supporting portion extending by a specific length side by side with the side surface enclosing portion from an edge of the opening part covering portion in a partial section of a section of the side surface enclosing portion corresponding to a length of the locking member, a pair of locking-member installing grooves provided in forms of cutting out a remaining sections on both sides of the locking-member supporting portion, and a pair of rotational axle supporting protrusions protruding in opposite circumferential directions from two opposing side surfaces in circumferential direction of the locking-member supporting portion, wherein the locking member comprises a pair of rotational axle aligned with an interval corresponding to a distance of the partial middle section, received in the pair of locking-member installing grooves respectively, inserted to the pair of rotational axle supporting protrusions on facing surfaces, and enabling the locking member to rotate, and a locking wing bent at the pair of the rotational axles, extending side by side with the side surface enclosing portion, having a portion corresponding to the locking-member supporting portion bored but an entirety being of one body, and having the self-locking protrusions and the main body locking protrusions formed on an inner surface.

\* \* \* \* \*